July 5, 1949.  G. W. MARTIN  2,475,397
FUEL TANK CLOSURE MEANS

Filed Aug. 10, 1945  2 Sheets-Sheet 1

Inventor:
George W. Martin.
By Brown Jackson Boettcher
Denner Attys.

July 5, 1949.   G. W. MARTIN   2,475,397
FUEL TANK CLOSURE MEANS
Filed Aug. 10, 1945   2 Sheets-Sheet 2
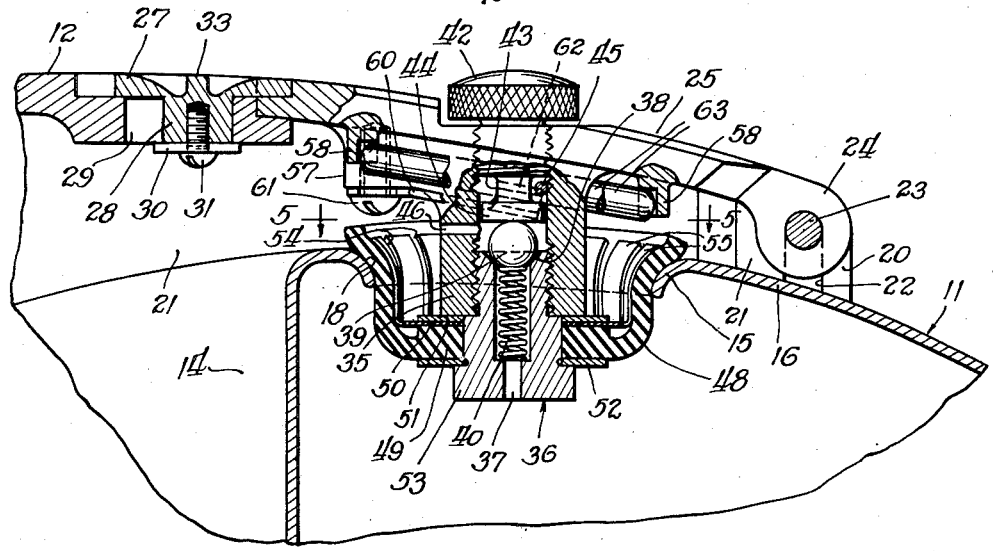
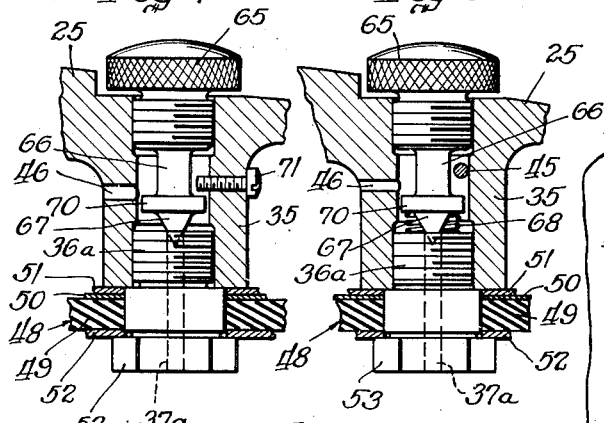
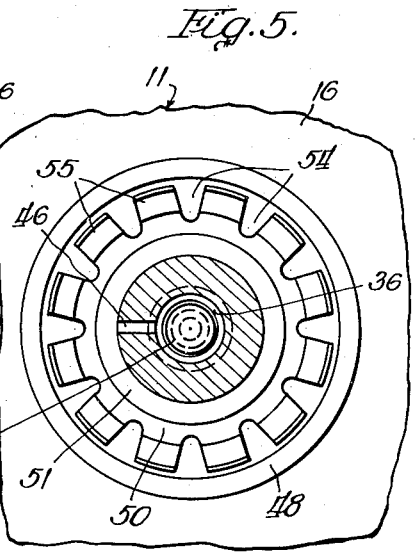
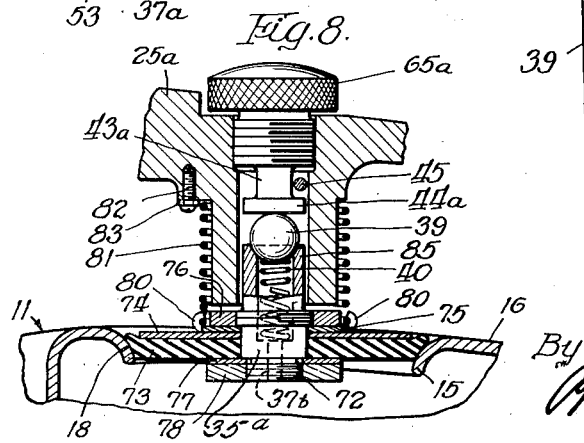
Inventor:
George W. Martin.
By Brown Jackson Boettcher Dienner
Attys.

Patented July 5, 1949

2,475,397

UNITED STATES PATENT OFFICE 2,475,397

FUEL TANK CLOSURE MEANS

George W. Martin, Eau Claire, Wis.

Application August 10, 1945, Serial No. 610,093

10 Claims. (Cl. 220—44).

This invention relates to outboard motor units, and has to do particularly with a fuel tank of such a unit and with closure means for the filler opening of the tank.

Outboard motor units as commonly constructed have a power head comprising the engine and its appurtenances enclosed within a housing, the latter including a fuel tank extending about the upper portion of the housing therein and having at a high point a filler opening for introduction of fuel, usually gasoline and oil, the latter for lubricating purposes, into the tank. The filler opening is closed by a screw plug having a flanged head under which is placed a sealing gasket, so as to assure a fluid tight closure when the plug is screwed tightly into the filler opening. The plug is provided with an air vent passage controlled by a spring loaded member, in the form of a second plug screwing into the first plug and also having a flanged head with a gasket disposed therebeneath. When the second plug is screwed into position opening the air vent passage, it is held in that position by its associated spring. In order to prevent spillage of fuel when transporting the unit, the second plug is turned in tight so as to close the air vent passage and also provide a fluid tight seal between the heads of the two plugs. The known closure means is open to various objections. The sealing gaskets rapidly wear in use and become ineffective for maintaining a fluid tight seal, so that in transporting the unit, during which it is usually placed on its side in more or less horizontal position, objectionable leakage of fuel is apt to occur. Also, the entrance opening of the air vent passage is exposed above the housing of the power head and is subject to clogging by entry of dirt, dust and other foreign materials, which may result in stoppage of the motor. Further, the removal and replacement of the closure means, for introducing fuel into the tank, requires an appreciable amount of time which in emergencies is objectionable. It is the usual practice, in the known motor units referred to, to attach the closure plug to the housing by a chain or equivalent flexible member to prevent loss of the plug. The presence of an anchor chain or the like interferes with manipulation of the closure plug for insertion or removal thereof, and there is the further risk that the chain may become detached either from the plug or from the housing and that the closure plug may be lost overboard.

My invention is directed to the provision of fuel tank closure means for outboard motor units, which avoids the above noted objections to the known type of closure means above referred to. More specifically, I provide tank closure means in which wear of the parts due to rubbing contact therebetween under pressure is avoided and which may be opened and closed with a minimum of delay, such closure means being associated with the tank and with the housing cover in a novel manner so as to provide a neat and streamlined effect and avoid all objectionable projections beyond the housing cover. In the closure means of my invention, the means for closing the filler opening of the tank is carried by a filler cover hinged to the power head housing cover and blending into the latter, the closure means being thus located at the high point of the fuel tank whereby the entire capacity of the tank may be utilized, this filler means also including air vent means operable exteriorly of the filler cover when the latter is in its closed position, the entrance to the air vent means being located interiorly of the power head housing and cover so as to be guarded thereby against clogging with dirt and other foreign materials. The closure means, including the associated air vent means, is permanently attached to the filler cover, which is hinged to the cover of the power head housing in such manner as effectively to eliminate possibility of accidental detachment from the main cover, the latter being fixed to the housing, whereby possibility of loss of the closure means overboard is eliminated. I also provide, in association with the closure means, means for yieldingly urging the filler cover in opening direction, and provide quick operating means for releasably holding the filler cover in its closed position, whereby upon release of the filler cover it is moved in opening direction to a sufficient extent to be readily grasped and moved into its full open position, in which the closure means is disposed clear of the filler opening which is then readily accessible for introduction of fuel into the tank. Further objects and advantages of my invention will appear from the detail description.

In the drawings:

Figure 4 is a fragmentary sectional view, on an enlarged scale, taken substantially on line 4—4 of Figure 1, certain parts being shown in elevation and certain other parts being broken away;

Figure 5 is a sectional view taken substantially on line 5—5 of Figure 4;

Figure 6 is a sectional view on the order of Figure 4 but omitting the fuel tank and with the filler closure plug mainly broken away, showing a modified form of closure means;

Figure 7 is a view similar to Figure 6 but showing a second modified form of closure means; and Figure 8 is a view similar to Figure 7 but showing a third modified form of closure means.

Figures 1, 3:
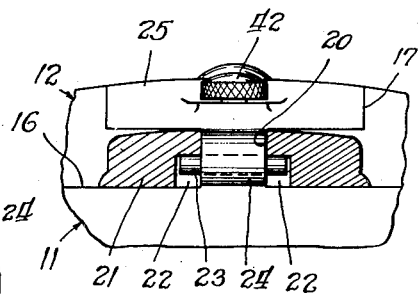
Figure 1 is a plan view of a power head of an outboard motor unit comprising a fuel tank and closure means therefor embodying my invention.
Figure 3 is a fragmentary sectional view, on an enlarged scale, taken substantially on line 3—3 of Figure 1.

In Figure 1 I have shown more or less semi-diagrammatically a power head 10 of an outboard motor unit. This power head 10 comprises a housing 11 enclosing the motor and its appurtenances (not shown), as is known in the art. A main cover 12, approximately ovoidal in plan, is secured to housing 11, conveniently by screws, in overlying relation to fly-wheel 13 of the motor unit. The upper portion of housing 11 is constructed to provide a fuel tank 14 disposed above and generally extending about the motor and its appurtenances enclosed within the housing 11. Tank 14 is provided, at the high point thereof, with a circular filler opening defined by a downwardly and inwardly curved flange 15 integral with top wall 16 of the tank. The main cover 12 is provided with an opening 17, shown as of rectangular shape, though it may be of any other suitable shape, overlying the filler opening 18 defined by flange 15. The main cover 12 is further provided with a rectangular recess 19 in its upper face communicating at its outer end with opening 17, and with a slot 20 extending from the outer end of opening 17 through peripheral flange 21 of cover 12, which flange 21 seats on the upper face of housing 11. Flange 21 is provided, at each end of slot 20, with a groove 22 extending from the lower face of flange 21. The grooves 22 receive the end portions of a pintle pin 23 passing through a hinge eye 24 fixed to, conveniently integral with, a filler cover 25 conforming to opening 17 of main cover 12. It will be noted that the side and end surfaces of opening 17 are beveled or inclined downward and inward of cover 12, and the side and end surfaces of filler cover 25 are also beveled correspondingly to the surfaces of opening 17 so that cover 25, when closed, seats snugly within the opening 17.

The filler cover 25 is provided, at the mid-portion of its inner end (when closed), with a notch or recess 26 in its upper face. Notch 26 is adapted for reception of the outer portion of a latch button 27 slidable in recess 19 and provided with a downwardly extending shank 28 (Figure 4) operating in a slot 29 in main cover 12. A retainer member or washer 30 is secured on the lower end of shank 28 by a screw 31, and restrains button 27 against upward movement relative to cover 12 while permitting sliding movement of the button toward and away from opening 17. When filler cover 25 is in its closed position, button 27 engages in notch 26, when moved to its outer or rearward position shown in Figure 4, effective for releasably securing filler cover 25 closed. Conveniently, button 27 is recessed at its upper face and there provided with a transverse rib 33 to facilitate manipulation thereof.

Filler cover 25 is provided at its under face with an integral downwardly extending tubular boss 35 interiorly threaded at its lower portion for reception of a thimble 36, of step formation, screwing into boss 35. This thimble 36 is provided with a step bore 37 opening through its ends, and with a valve seat 38 at the upper end of bore 37, for reception of a ball valve 39 urged upward by a compression spring 40 confined between valve 39 and the lower end of the upper portion of bore 37, which is of increased diameter. A vent valve control screw 42, provided at its upper end with an enlarged knurled head, threads into boss 35 from the upper end thereof, this screw having at its lower end a reduced neck 43 carrying at its lower end a flat head or disk 44 disposed to contact valve 39, the upward travel of screw 42 being limited by a cross pin 45 secured in boss 35 and extending there across above disk 44. The boss 35 is provided with an air inlet duct 46 opening into the interior thereof between thimble 36 and disk 44 so that, when valve 39 is raised from its seat 38, air may enter tank 12 through duct 46 and bore or passage 37, as will be readily understood. By turning the screw 42 in, the ball valve 39 may be held tightly on its seat, effective for closing the upper end of bore 37, as shown in Figure 4. As will readily be understood, the valve 39 and screw 42 and associated parts provide air vent means for venting air to the interior of tank 12 during the operation of the motor, while also providing means for effecting a fluid tight closure of the vent means when it is desired to transport the unit comprising the motor and tank 12 and associated parts.

Figure 2:
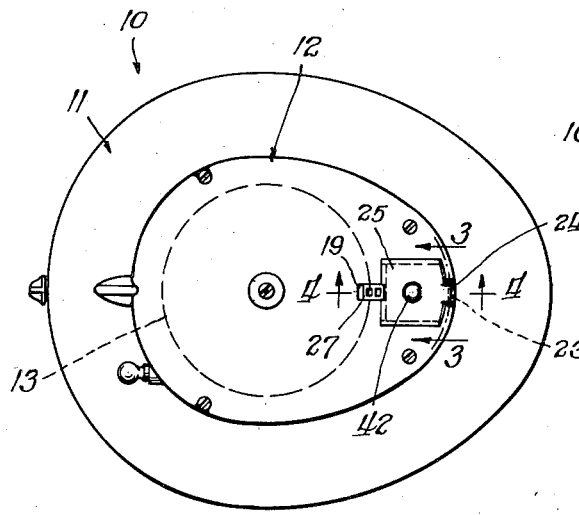
Figure 2 is a fragmentary plan view, on an enlarged scale, of the power head cover and associated parts with the filler cover in its fully opened position, the portions of the power head extending outward beyond the cover therefor being omitted for clearness of illustration.

Thimble 36 carries closure plug means comprising a plug member 48 which is cupped and normally of approximately hemispherical shape, this member 48 having a thickened base portion 49 fitting about thimble 36, there being a spring spider 50 disposed at the upper face of body portion 49. The spider 50 and body portion 49 of plug member 48 are clamped between a washer 51 disposed about thimble 36 and contacting the lower end of boss 35, and a washer 52 disposed about thimble 36 and seating on a flange element 53 at the lower end of the thimble. The spring spider 50 is provided with a plurality of radial slots 54, defining between them resilient fingers 55 which bear against the inner face of plug member 48 and exert outward pressure radially thereon. In the closed position of the filler cover 25, plug member 48 fits tightly in filler opening 18 and over flange 15, in fluid tight sealing contact therewith, as shown in Figure 4, plug member 48 being distorted to the form there shown by its passage downward through opening 18 in the closing of filler cover 25. In addition to exerting outward radial pressure against the surrounding wall of the plug member 48, the fingers 55 of spring spider 50 also exert upward pressure on the cover 25 tending to move the latter in opening direction. Under normal operating conditions, the filler cover 25 is held in its closed position by button 27, as above explained, and the screw 42 is threaded outward through boss 35, preferably to the extent allowed by pin 45, thus permitting opening of valve 39 and establishing communication between the interior of fuel tank 12 and atmosphere, through duct 46 and bore or passage 37. It will be noted that the duct 46 is disposed below main cover 12 and the filler cover 25, in the closed position of the latter, and is guarded thereby against clogging by mud or other foreign material. When it is desired to obtain access to the filler opening 18, for introducing fuel into tank 12 or for any other purpose, the button 27 is moved from its position shown in Figure 4 to its position shown in Figure 2, thus releasing the filler cover 25, which is then moved upward by the upward pressure exerted thereon by closure plug member 48 and spring spider 50, as above explained, into position to be readily grasped so as to be turned about pintle pin 23 into its full open position shown in Figure 2. The filler cover 25 and the closure plug means carried thereby are then disposed clear of filler opening 18, which is thus rendered fully accessible. In the closing movement of filler cover 25 the plug member 48 enters filler opening 18 with a more or less straight line movement thus avoiding subjecting this member to objectionable rubbing contact and abrasion.

Filler cover 25 preferably is further provided at its under side with a lug 57 extending inward from boss 35, and with two pairs of lugs 58 disposed at opposite sides of boss 35. A substantially V-shaped leaf spring 60 is secured, by means of a screw 61, to lug 57, this spring being provided, at the outer end of each arm thereof, with an arcuate finger 62. The fingers 62 are disposed to engage the mid portions of two shear pins 63, disposed at opposite sides of boss 35 and seating at their ends in the corresponding lugs 58, appropriately formed to that end. The spring 60 and the lugs 58 provide convenient means for mounting spare shear pins under the filler cover 25, so as to be readily accessible if and as required.

The plug member 48 may, within the broader aspects of my invention, be formed of any suitable material, though preferably it is formed of an elastic rubber like material, such as "neoprene," or like material, which will not be adversely affected by the gasoline and oil or like fuel within tank 12. The spring spider 50 conveniently is formed of spring brass, though any other suitable material may be used.

In the modification shown in Figure 6, thimble 36ª is provided with a bore or passage 37ª of substantially uniform diameter, the upper portion of which provides a seat for a conical valve element 67 at the lower end of reduced neck 66 of a valve control screw 65 threaded through the upper end of boss 35. Screw 65 is urged upward by a compression spring 68 disposed about valve element 67 and confined between the upper end of thimble 36ª and shoulder 70 at the lower end of neck 66. In normal operation the screw 65 is turned outward a sufficient distance to move the valve element 67 from its seat permitting free flow of air through bore or passage 37ª, compression spring 68 serving to guard against closing of valve 67 due to turning in of screw 65 by vibration. The pin 45 serves to prevent complete withdrawal of screw 65 so as to guard against possible loss thereof. When it is desired to transport the outboard motor unit, the screw 65 is turned in so as to seat valve element 67 firmly in the upper end of passage 37ª, thus providing a fluid tight seal therewith.

The modification shown in Figure 7 is similar to that shown in Figure 6, with the exception that the compression spring 68 of Figure 6 is omitted and the stop pin 45 of Figure 6 is replaced by a screw 71 secured in boss 35 with its inner end portion overlying shoulder 70 of screw 65. When it is desired to transport the unit, the screw 65 is turned all of the way in so that the valve element 67 thereof provides a fluid tight closure for the upper end of passage or bore 37ª of thimble 36ª. In normal operation of the unit, screw 65 is turned out sufficiently to bring shoulder 70 thereof into binding contact with screw 71, effective for restraining screw 65 against turning and thereby preventing its turning in due to vibration, guarding against possible unintended closing of the air vent means.

In the modification shown in Figure 8, boss 35ª of filler cover 25ª receives thimble 72 extending upward into boss 35ª and downward therebelow. The thimble 72 is provided with a stepped bore or passage 37ᵇ and is formed at its upper end to provide a seat for a ball valve 39 urged upward by compression spring 40 confined between valve 39 and the wall at the lower end of the upper portion of bore 37ᵇ, which is of increased diameter. Closure plug means, comprising a closure plug 73, formed of "neoprene" or other suitable material, is mounted upon the lower portion of thimble 72. A backing disk or washer 74 seats upon the upper face of plug 73, in contact with a washer 75 disposed about thimble 72 and confined between disk 74 and a nut 76 screwing on to thimble 72. A washer 77 is disposed about the thimble 72 and confined between the lower face thereof and a nut 78 screwing on the lower end of the thimble. It will be seen that the closure plug means, comprising the plug member 73 and disk 74 and associated parts, is clamped on the thimble 72 between the nuts 76 and 78. The washer 75 is provided with a plurality of arcuate fingers 80, which engage over the lower convolution of a coil compression spring 81 disposed about boss 35ª, this spring being secured at its upper end to filler cover 25ª, conveniently by means of a screw 82 threading into an extension of boss 35ª and passing through an eye 83 at the upper end of spring 81. It will be seen that spring 81 provides a connection between boss 35ª, or cover 25ª, and the thimble 72 so that this thimble and the parts carried thereby move with the cover 25ª.

A screw 65ª, similar to screw 42 of Figure 4, threads through the upper end of boss 35ª for controlling the ball valve 39 as and for the purposes above noted with respect to Figure 4. It will be noted that the outside diameter of the portion of thimble 72 which extends into boss 35ª is appreciably less than the interior diameter of the boss, leaving an annular air passage 85 therebetween. It will also be noted that the coil spring 81 is spaced an appreciable distance from the boss 35ª radially thereof. The passage 85 serves to vent air to the interior of tank 12, when the valve 39 is lifted from its seat by compression spring 40, and this valve provides a fluid tight seal with the upper end of passage 37ᵇ of thimble 72 when it is held seated by the screw 65ª. The compression spring 81 is of such length as to be placed under appreciable compression when the filler cover 25ª is in closed position, effective for holding the plug 73 tightly seated in the filler opening 18 so as to provide a fluid tight closure therewith. It will be seen that when the cover 25ª is swung to open position, the plug member 73 is moved therewith into position clear of the filler opening 18, and in the closing movement of filler cover 25ª the plug 73 is moved into position seating in flange 15 and closing the filler opening 18. The clearances between the boss 35ª and spring 81 and thimble 72 are sufficient to accommodate any slight misalignment of parts, the spring 81 permitting plug 37 to be accurately aligned with and seat tightly in the filler opening 18. The under face of disk 44ª, at the lower end of neck 43ª of screw 65ª, is flat or planar and is effective for holding the valve 39 tightly seated, when the screw 65ª is turned into position to close the air vent, even though the nipple 72 is not in coaxial alignment with the screw 65ª due to seating of plug 73 in filler opening 18. It will also be noted that the air inlet passage 85 opens into the space below the main cover 12 and the filler cover 25 so as to be guarded thereby against clogging by mud or other foreign materials.

As has been indicated above, and as will be understood by those familiar with outboard motor units and like mechanisms, changes in construction and arrangement of parts of my invention may be resorted to without departing from the field and scope thereof, and I intend to include all such variations, as fall within the scope of the appended claims, in this application in which the preferred forms only of my invention have been disclosed.

I claim:

1. In an outboard motor unit, a fuel tank having a filler opening in its top wall, a filler cover movable to a closed position overlying said filler opening and to an open position exposing said opening, said filler cover having a downwardly extending tubular boss at its under side, a thimble at the lower end of said boss connected thereto for movement therewith and extending into the lower portion thereof, the interior of said boss communicating with atmosphere, closure means carried by said thimble disposed and adapted to close said filler opening when said filler cover is in closed position and to be moved into position clear of said filler opening in the movement of said filler cover to open position, said thimble having a passage opening through its upper end and below said closure means, and valve means controlling the upper end of said passage operable exteriorly of said filler cover in the closed position of the latter.

2. In an outboard motor unit, a fuel tank having a filler opening in its top wall, a filler cover movable to a closed position overlying said filler opening and to an open position exposing said opening, said filler cover having a downwardly extending tubular boss at its under side, a thimble screwing into the lower end of said boss having a passage opening through its ends and a valve seat at its upper end, resilient means carried by said thimble disposed and adapted to close said filler opening and exert upward pressure on said filler cover when the latter is closed and to be moved into position clear of said filler opening in the movement of said filler cover to open position, the interior of said boss communicating with atmosphere, means operable exteriorly of said filler cover in its closed position comprising a valve member cooperating with said valve seat for optionally opening and closing said passage, and means for releasably securing said filler cover closed.

3. In an outboard unit, a fuel tank having a filler opening in its top wall, a filler cover movable to a closed position overlying said filler opening and to an open position exposing said opening, said filler cover having a downwardly extending tubular boss at its under side, a thimble screwing into the lower end of said boss having a passage opening through its ends and a valve seat at its upper end, resilient means carried by said thimble disposed and adapted to close said filler opening and exert upward pressure on said filler cover when the latter is closed and to be moved into position clear of said filler opening in the movement of said filler cover to open position, the interior of said boss communicating with atmosphere, a ball valve carried by said thimble yieldingly urged upward and cooperable with said seat for closing the upper end of said passage, a screw member threading through the upper end of said boss cooperable with said valve for closing it and permitting opening thereof, and means for releasably securing said filler cover closed.

4. In an outboard motor unit, a fuel tank having a filler opening in its top wall, a filler cover movable to a closed position overlying said filler opening and to an open position exposing said opening, said filler cover having a downwardly extending tubular boss at its under side, a thimble screwing into the lower end of said boss having a passage opening through its ends and a valve seat at its upper end, an upwardly opening cupped elastic closure plug and a resilient member therein exerting pressure thereon substantially radially outward thereof, said thimble having at its lower portion an outwardly extending clamping element, said plug and resilient member being clamped between said element and the lower end of said boss and disposed and adapted to close said filler opening and exert upward pressure on said filler cover when the latter is closed and to be moved into position clear of said filler opening in the movement of said filler cover to open position, a ball valve carried by said thimble yieldingly urged upward and cooperable with said seat for closing the upper end of said passage, a screw member threading through the upper end of said boss cooperable with said valve for closing it and permitting opening thereof, said boss having an air duct opening thereinto between said thimble and screw member, and means for releasably securing said filler cover closed.

5. In an outboard motor unit, a fuel tank having a filler opening in its top wall, a filler cover movable to a closed position overlying said filler opening and to an open position exposing said opening, said filler cover having a downwardly extending tubular boss at its under side, a thimble screwing into the lower end of said boss extending therebelow and having an air passage opening through its ends, a closure member carried by said thimble between the lower end thereof and said boss disposed and adapted to close said filler opening when said filler cover is closed and to be moved into position clear of said filler opening in the movement of said filler cover to open position, said boss having an air duct opening thereinto above said thimble, and valve means comprising a screw member threading through the upper end of said boss for optionally establishing and cutting off communication between said duct and passage.

6. In an outboard motor unit, a fuel tank having a filler opening in its top wall, a filler cover movable to a closed position overlying said filler opening and to an open position exposing said opening, said filler cover having a downwardly extending tubular boss at its under side, a thimble screwing into the lower end of said boss extending therebelow and having an air passage opening through its ends, a closure member carried by said thimble between the lower end thereof and said boss disposed and adapted to close said filler opening when said filler cover is closed and to be moved into position clear of said filler opening in the movement of said filler cover to open position, said boss having an air duct opening thereinto above said thimble, and a screw member threading through the upper end of said boss having at its lower end a valve element for closing and opening the upper end of said passage.

7. In an outboard motor unit, a fuel tank having a filler opening in its top wall, a filler cover movable to a closed position overlying said filler opening and to an open position exposing said opening, said filler cover having a downwardly extending tubular boss at its under side, a thimble extending into the lower portion of said boss defining therewith an air inlet passage and extending downward therefrom, said thimble having an air passage opening through its ends, a coil spring disposed about said boss secured thereto at its upper end and to said thimble at its lower end, a closure plug carried by said thimble disposed and adapted to enter and close said filler opening when said filler cover is closed and to be moved into position clear of said filler opening in the movement of said filler cover to open position, said spring being of a length to be placed under compression effective for holding said plug seated in said filler opening when said filler cover is closed, and means for releasably securing said filler cover closed.

8. In an outboard motor unit, a fuel tank having a filler opening in its top wall, a filler cover movable to a closed position overlying said filler opening and to an open position exposing said opening, said filler cover having a downwardly extending tubular boss at its under side, a thimble extending into the lower portion of said boss in spaced relation thereto defining therewith an air inlet passage and extending downward therefrom, said thimble having an air passage opening through its ends, a coil spring disposed about said boss spaced therefrom and secured thereto at its upper end and to said thimble at its lower end, a closure plug carried by said thimble disposed and adapted to enter and close said filler opening when said filler cover is closed and to be moved to position clear of said filler opening in the movement of said filler cover to open position, said spring being of a length to be placed under compression effective for holding said plug seated in said filler opening when said filler cover is closed, a ball valve of appreciably less diameter than the interior of said boss disposed therein seatable in the upper end of said passage for closing it and yieldingly urged upward, a screw member threading through the upper end of said boss for holding said valve seated and permitting unseating thereof optionally, and means for securing said filler cover closed.

9. In an outboard motor unit, a housing comprising a fuel tank having a filler opening adjacent its top, a main cover secured on said housing, a filler cover on said main cover movable to a closed position and an open position respectively covering and exposing said opening, closure means carried by said filler cover for respectively closing and opening said filler opening in the movement of said filler cover to and from closed position, said closure means comprising a closure member disposed and adapted to close said opening when said filler cover is moved to closed position and having an air vent passage opening into said tank when said closure member is in position closing said filler opening, and valve means carried by said filler cover comprising a member exposed at the outer face of said filler cover when it is closed operable for optionally closing and opening said passage.

10. In an outboard motor unit, a housing comprising a fuel tank having a filler opening adjacent its top, a main cover secured on said housing, a filler cover on said main cover movable to a closed position and an open position respectively covering and exposing said opening, closure means carried by said filler cover for respectively closing and opening said filler opening in the movement of said filler cover to and from closed position, said closure means comprising a closure member disposed and adapted to close said opening when said filler cover is moved to closed position and having an air vent passage opening at its lower end into said tank and at its upper end exterior of said tank and beneath said filler cover, when the latter is in closed position, and valve means carried by said filler cover comprising a member exposed at the outer face of said filler cover when it is closed operable for optionally closing and opening said passage.

GEORGE W. MARTIN.

REFERENCES CITED

The following references are of record in the file of this patent:

UNITED STATES PATENTS

| Number | Name | Date |
| --- | --- | --- |
| 1,555,996 | Leverich | Oct. 6, 1925 |
| 1,747,424 | Casey | Feb. 18, 1930 |
| 1,793,759 | Stant | Feb. 24, 1931 |
| 1,862,769 | Ruppel | June 14, 1932 |
| 1,922,901 | Ruppel | Aug. 15, 1933 |
| 2,089,251 | De Frees | Aug. 10, 1937 |
| 2,159,477 | Friedman | May 23, 1939 |
| 2,164,450 | Esbaugh et al. | July 4, 1939 |
| 2,203,801 | Swank | June 11, 1940 |
| 2,256,831 | Karey | Sept. 23, 1941 |
| 2,314,710 | Keller | Mar. 23, 1943 |
| 2,340,593 | Illsley | Feb. 1, 1944 |
| 2,351,050 | Karey | June 13, 1944 |